(12) United States Patent
Yatake

(10) Patent No.: US 6,737,449 B1
(45) Date of Patent: *May 18, 2004

(54) INK JET RECORDING INK AND INK JET RECORDING APPARATUS

(75) Inventor: Masahiro Yatake, Suwa (JP)

(73) Assignee: Seiko Epson Corporation, Tokyo-To (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,021

(22) Filed: Feb. 17, 1998

(30) Foreign Application Priority Data

Feb. 17, 1997 (JP) .............................................. 9-032486

(51) Int. Cl.⁷ .............................................. C09D 11/10
(52) U.S. Cl. .................. 523/160; 106/31.6; 106/31.89; 523/201
(58) Field of Search ................................. 523/160, 161, 523/201; 106/31.13, 31.28, 31.6, 31.85, 31.89; 347/84, 85, 86

(56) References Cited

U.S. PATENT DOCUMENTS

| | | | | |
|---|---|---|---|---|
| 4,165,406 A | * | 8/1979 | Tugukuni et al. ............. | 428/407 |
| 4,876,313 A | * | 10/1989 | Lorah ......................... | 525/281 |
| 4,894,397 A | * | 1/1990 | Morgan et al. .............. | 523/201 |
| 5,306,743 A | * | 4/1994 | Klesse et al. ................ | 523/201 |
| 5,395,431 A | * | 3/1995 | Siddiqui et al. ......... | 106/31.57 |
| 5,604,276 A | * | 2/1997 | Suga .......................... | 524/100 |
| 5,661,511 A | * | 8/1997 | Kashiwazaki et al. ...... | 347/100 |
| 5,667,572 A | * | 9/1997 | Taniguchi et al. ........ | 106/31.36 |
| 5,690,721 A | * | 11/1997 | Itoh ......................... | 106/31.13 |
| 5,725,961 A | * | 3/1998 | Ozawa et al. ................ | 428/500 |
| 5,746,818 A | * | 5/1998 | Yatake ..................... | 106/31.86 |
| 5,798,776 A | * | 8/1998 | Uchiyama et al. ........ | 106/31.75 |
| 5,803,959 A | * | 9/1998 | Johnson et al. .......... | 106/31.75 |
| 5,814,685 A | * | 9/1998 | Satake et al. ............... | 523/201 |
| 5,830,265 A | * | 11/1998 | Tsang et al. ............. | 106/31.75 |
| 5,841,453 A | * | 11/1998 | Sasaki ......................... | 347/86 |
| 5,856,377 A | * | 1/1999 | Sato et al. ................... | 523/201 |
| 5,889,083 A | * | 3/1999 | Zhu ........................... | 523/161 |
| 5,946,012 A | * | 8/1999 | Courian et al. ............... | 347/63 |
| 5,976,233 A | * | 11/1999 | Osumi et al. ............ | 106/31.86 |
| 6,114,411 A | * | 9/2000 | Nakamura et al. .......... | 523/161 |
| 6,494,946 B1 | * | 12/2002 | Belmont et al. ............ | 106/472 |

FOREIGN PATENT DOCUMENTS

| | | |
|---|---|---|
| EP | 0261764 | 3/1988 |
| EP | 0761783 | 3/1991 |
| EP | 0506128 | 9/1992 |
| EP | 0608021 | * 7/1994 |
| JP | 4359072 | 11/1992 |
| WO | 9749774 | 12/1991 |

OTHER PUBLICATIONS

English Abstract of JP 4359072 of Nov. 1992.

* cited by examiner

Primary Examiner—Callie Shosho
(74) Attorney, Agent, or Firm—Ladas & Parry (57) ABSTRACT

An ink composition is provided which can realize a good image having no significant featuring or bleeding on various recording media, especially even on plain paper, recycled paper, and recording media having thereon a gloss layer. The ink composition comprises a pigment, a water-soluble organic solvent, a surfactant, and water, wherein the pigment is dispersible and/or soluble in water without a dispersant and the surfactant is an acetylene glycol surfactant. This ink composition can realize an image having no significant feathering or bleeding on various recording media.

23 Claims, 3 Drawing Sheets

INK JET RECORDING INK AND INK JET RECORDING APPARATUS

BACKGROUND OF THE INVENTION

1. Field of the Invention

The present invention relates to an ink jet recording ink which can yield a print having high quality with high reliability on various recording media, especially on plain papers, recycled papers, and special papers having thereon an ink-receptive layer.

2. Background Art

Ink jet recording is a method wherein an ink is ejected as a droplet through a fine nozzle to record letters or figures onto the surface of a recording medium. Ink jet recording systems which have been put to practical use include: a method wherein an electric signal is converted to a mechanical signal using an electrostrictive strain to intermittently eject an ink reservoired in a nozzle head section, thereby recording letters or symbols on the surface of a recording medium and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium.

Properties required of inks used in the ink jet recording includes a good drying property of the print, no feathering created, homogeneous printing performed on the surface of various recording medium, and, in the case of multi-color printing, no color-to-color intermixing occurred.

Feathering on paper occurs attributable to the presence of fibers different from each other in ink penetration, a black ink and a color ink are intermixed at the boundary therebetween to deteriorate the image quality. Further, when the ink put on a recording medium is touched with a hand, the ink is unfavorably detached from the recording medium.

In order to overcome these drawbacks, various ink compositions have been proposed in the art.

For example, Japanese Patent Publication 2907/1990 proposes an ink containing glycol ether as a wetting agent, Japanese Patent Publication 15542/1989 proposes an ink containing a water-soluble organic solvent, and Japanese Patent Publication 3837/1990 proposes an ink containing a dye solubilizer.

Further, in order to improve the penetrability of the ink, U.S. Pat. No. 5,156,675 proposes addition of diethylene glycol monobutyl ether, U.S. Pat. No. 5,183,502 proposes addition of Surfynol 465, an acetylene glycol surfactant, and U.S. Pat. No. 5,196,056 discloses addition of both diethylene glycol monobutyl ether and Surfynol 465. Diethylene glycol mono-n-butyl ether is known also as butylcarbitol and described, for example, in U.S. Pat. No. 3,291,580. Further, utilization of an ether of diethylene glycol has been studied in U.S. Pat. No. 2,083,372. Furthermore, Japanese Patent Laid-Open No. 147861/1981 proposes use of a pigment and triethylene glycol monomethyl ether in combination.

Despite the proposal of the various inks, an ink composition capable of realizing an image having no significant feathering and bleeding has been still desired in the art.

Further, heating recording paper has been studied in order to reduce feathering and bleeding. Heating of the recording paper at the time of recording, however, poses problems including that a lot of time is taken for building up the heating section in the apparatus to a predetermined temperature, power consumption of the body of the apparatus is increased, or recording paper or other recording media are damaged by the heat.

In the ink composition using a pigment, an attempt to suppress penetration of the ink in the surface of a recording medium has been made to ensure the print quality. In some cases, however, when the ink composition does not penetrate into the recording medium to a certain extent, the pigment is left on the surface of the recording medium, deteriorating the scratch resistance of the print. Further, in recent years, a recording medium has been utilized wherein a gloss layer is provided thereon, a gloss is put on the recorded image and added value is imparted to the image. A pigment-type ink capable of realizing an image having good scratch resistance on the recording medium has been desired in the art.

SUMMARY OF THE INVENTION

The present inventors have now found that an ink composition comprising a combination of a particular pigment with an acetylene glycol surfactant can effectively suppress feathering or bleeding and can realize a high-quality image having excellent scratch resistance. The present invention has been made based on this finding.

Accordingly, an object of the present invention is to provide an ink composition which can realize a good image having no significant feathering or bleeding on various recording media, especially on plain paper, recycled paper, and recording media having thereon a gloss layer.

According to the present invention, there is provided an ink composition comprising a pigment, a water-soluble organic solvent, a surfactant, and water, wherein the pigment is dispersible and/or soluble in water without a dispersant and the surfactant is an acetylene glycol surfactant.

DETAILED DESCRIPTION OF THE INVENTION

Ink Composition

The ink composition of the present invention may be used in recording systems using an ink composition. Recording systems using an ink composition include, for example, an ink jet recording system, a recording system using a writing implement, such as a pen, and other various printing systems. In particular, the ink composition of the present invention is preferably used in ink jet recording.

The ink composition of the present invention comprises at least a pigment, a water-soluble organic solvent, a surfactant, and water. Furhter, the pigment is dispersible and/or soluble in water without a dispersant, and the surfactant is an acetylene glycol surfactant. The ink composition according to the present invention can effectively suppress feathering or bleeding and can realize a high-quality image having scratch resistance. The ink composition according to the present invention has an additional advantage that the drying property of the print is excellent and the color density is high. For example, the ink composition according to the present invention can be used in a recording method wherein an ink in a certain amount is printed in two or a plurality of divided portions. According to this method, a print having higher density can be provided.

A preferred pigment used in the present invention is one which has been treated so that at least one functional group, selected from carbonyl, carboxyl, hydroxyl, and sulfone groups, or a salt thereof is bonded to the surface of the pigment, thereby permitting the pigment to be dispersible and/or soluble in water without a dispersant. This pigment can be prepared by grafting a functional group or a molecule containing a functional group onto the surface of carbon black by physical treatment, such as vacuum plasma, or chemical treatment. In the present invention, a single type or a plurality of types of functional groups may be grafted onto one carbon black particle. The type of the functional group to be grafted and the degree of grafting may be suitably determined by taking, for example, the dispersion stability in the ink, the color density, and the drying property at the front face of the ink jet head into consideration.

When the pigment is stably present in water without any dispersant, this state is expressed as the state of "dispersion and/or dissolution." It is sometimes difficult to distinguish the state of dissolution of a material from the state of dispersion of the material. In the present invention, any pigment can be used so far as the pigment is stably present in water without any dispersant independently of whether the pigment is in a dispersion form or a solution form. A pigment, which can stably exist in water without any dispersant is often referred to herein as a "water-soluble pigment." The water-soluble pigment, however, does not exclude a pigment which is in the state of dispersion in water.

According to a preferred embodiment of the present invention, the pigment is used as a pigment dispersion having an average particle diameter of 50 to 200 nm and a degree of dispersion of not more than 10.

The pigment, which is preferably used in the present invention, may be prepared, for example, by a method disclosed in Japanese Patent Laid-Open No. 3498/1996. Further, the pigment may be a commercially available one, and preferred examples thereof include Microjet CW1 manufactured by Orient Chemical Industries, Ltd.

The amount of the pigment added to the ink composition is preferably about 2 to 10% by weight, more preferably 4 to 8% by weight.

Examples of preferred acetylene glycol surfactants usable in the present invention include compounds represented by the following formula (I)

(I)

wherein $0 \leq m+n \leq 50$ and $R^1$, $R^2$, $R^3$, and $R^4$ each independently represent an alkyl group.

Among the compounds represented by the formula (I), 2,4,7,9-tetramethyl-5-decyn-4,7-diol, 3,6-dimethyl-4-octyne-3,6-diol, 3,5-dimethyl-1-hexyn-3-ol and the like are particularly preferred. Commercially available products may be used as the acetylene glycol surfactant represented by the formula (I), and specific examples thereof include Surfynol 104, 82, 465, 485, and TG, all of which are commercially available from Air Products and Chemicals, Inc.

According to a preferred embodiment of the present invention, the amount of the acetylene glycol surfactant added is preferably 0.3 to 2% by weight, more preferably 0.5 to 1.5% by weight, based on the total amount of the ink. Addition of the acetylene glycol surfactant in an amount falling within the range can realize an image suffering from less feathering or bleeding.

Some of the acetylene glycol surfactants, for example, Surfynol 104 and TG, have low HLB and hence have low water solubility. This solubility can be improved by adding additives, such as a glycol ether, a glycol compound, or a surfactant, to the ink composition.

The water-soluble organic solvent used in the present invention, together with water, constitutes a main solvent, and the water-soluble organic solvent is not particularly limited so far as it has compatibility with water and has no unfavorable interaction with other ingredients in the ink composition.

According to a preferred embodiment of the present invention, the following compounds may be added to the water-soluble organic solvent from the viewpoint of preventing the ink composition from drying at the nozzle plate in the ink jet recording head: ethylene glycol, diethylene glycol, triethylene glycol, tetraethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,5-pentanediol, 1,6-hexanediol, glycerine, thiodiglycol, mesoerythritol, and pentaerythritol. Among them, glycerin, 1,5-pentanediol, diethylene glycol, or thiodiglycol, and a mixture of these compounds are particularly preferred because they can properly regulate the viscosity of the ink composition, effectively prevent the clogging of the nozzle, and can increase the cloud point of the ink composition. Further, they can advantageously improve the solubility of the acetylene glycol surfactant (particularly Surfynol 104 and Surfynol TG) in the ink composition and, even when the ink composition is placed under high temperature conditions, can prevent phase separation of the ink composition.

Although the amount of the water-soluble organic solvent added may be properly determined, it is preferably less than about 1 to less than 30% by weight, more preferably about 5 to 15% by weight, based on the ink composition.

According to another preferred embodiment of the present invention, water-soluble organic solvents which may be added to the ink composition according to the present invention include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propyleneglycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; formamide; acetamide; dimethyl sulfoxide; sorbit; sorbitan; acetin; diacetin; triacetin; and sulfolane. These organic solvents can advantageously improve the solubility of other ingredients into the ink composition, can improve the penetration of the ink composition into a recording medium, for example, paper, and, in addition, can effectively prevent clogging of the nozzle, and, hence, addition thereof is preferred. Although the amount of the organic solvent added may be properly determined, it is preferably about 0.1 to 60% by weight, more preferably about 5 to 15% by weight.

According to a preferred embodiment of the present invention, the ink composition of the present invention contains 2-pyrrolidone. Since the acetylene glycol surfactant contained in the ink composition of the present invention is nonionic, the surfactant often imparts a low cloud point to the ink composition. Addition of 2-pyrrolidone has the effect of increasing the cloud point without extremely increasing the viscosity. The amount of 2-pyrrolidone added may be suitably determined so as to attain the above effect and is preferably 1 to less than 20% by weight based on the ink composition.

According to a preferred embodiment of the present invention, the ink composition of the present invention contains triethanolamine. Addition of triethanolamine renders the ink composition alkaline to a proper extent and in addition has the effect of moisture retention to effectively prevent clogging of the nozzle. Although the amount of triethanolamine added may be properly determined, it is preferably about 0.5 to 3% by weight.

Preferably, the pH value of the ink composition of the present invention can be adjusted in the range of 7 to 11, more preferably 8 to 10. When the pH value is in this range, the pigment and, in addition, the resin emulsion described below can advantageously be allowed to stably exist in the ink composition. The pH value can be adjusted by addition of triethanolamine or a suitable alkali (for example, an organic alkali, such as ammonia, or an alkali metal salt). Preferred alkalis include potassium hydroxide. Adjustment of the pH value by a combination of triethanolamine with potassium hydroxide is particularly preferred. In the case of the combination of triethanolamine with potassium hydroxide, the amount of potassium hydroxide added is preferably about 0.01 to 0.2% by weight.

According to a preferred embodiment of the present invention, the ink composition of the present invention contains a water-soluble emulsion. Addition of the water-soluble emulsion can improve the fixation and the scratch resistance of the resultant print. Preferably, the water-soluble emulsion comprises a continuous phase of water and a dispersed phase of acrylic resin, methacrylic resin, styrene resin, urethane resin, acrylamide resin, epoxy resin, or a mixture of these resins. Particularly preferred is a water-soluble emulsion wherein the dispersed phase comprises a resin composed mainly of acrylic acid and/or methacrylic acid. The resin is not limited by polymerization methods and may be, for example, a block copolymer, a random copolymer or the like. Further, preferably, the water-soluble emulsion used in the ink composition of the present invention has a film forming property and has a lowest possible film forming temperature of preferably room temperature or below, more preferably 0 to 20° C.

According to a preferred embodiment of the present invention, the resin component of the water-soluble emulsion is a resin particle having a core/shell structure comprising a core surrounded by a shell. For example, the resin particle may be a resin which is capable of improving the drying to the touch and the fixation of the ink is incorporated into the core and a resin component, which permits resin particles to stably exist in the ink composition, is incorporated into the shell. According to a preferred embodiment of the present invention, the core comprises a resin having a crosslinked structure. Materials for the core usable herein include styrene, tetrahydrofurfuryl acrylate and butyl methacrylate, (α, 2, 3, or 4)-alkylstyrene, (α, 2, 3, or 4)-alkoxystyrene, 3,4-dimethylstyrene, α-phenylstyrene, divinylbenzene, vinylnaphthalene, dimethylamino(meth) acrylate, dimethylaminoethyl(meth)acrylate, dimethylaminopropylacrylamide, N,N-dimethylaminoethyl acrylate, acryloylmorphine, N,N-dimethylacrylamide, N-isopropylacrylamide, N,N-diethylacrylamide, methyl (meth)acrylate, ethyl(meth)acrylate, propyl(meth)acrylate, ethylhexyl(meth)acrylate, and other alkyl(meth)acrylates, methoxydiethylene glycol(meth)acrylate, (meth)acrylate with diethylene glycol or polyethylene glycol ethyl, propyl, or butyl ester, cyclohexyl(meth)acrylate, benzyl(meth) acrylate, phenoxyethyl(meth)acrylate, isobornyl(meth) acrylate, hydroxyalkyl(meth)acrylate, and fluorine-, chlorine-, or silicon-containing (meth)acrylate, (meth) acrylamide, and maleic amide. When a crosslinked structure is introduced in addition to the (meth)acrylic acid, it is possible to use (mono, di, tri, tetra, or poly)ethylene glycol di(meth)acrylate, (meth)acrylates of 1,4-butanediol, 1,5-pentanediol, 1,6-hexanediol, 1,8-octanediol, and 1,10-decanediol, trimethylolpropane tri(meth)acrylate, glycerin (di or tri)(meth)acrylate, di(meth)acrylate of ethylene oxide adduct of bisphenol A or F, neopentyl glycol di(meth) acrylate, pentaerythritol tetra(meth)acrylate, and dipentaerythritol hexa(meth)acrylate.

For the formation of the shell, the same material as used in the formation of the core may be used.

Emulsifiers usable for the formation of the polymeric fine particles include sodium laurylsulfate, potassium laurylsulfate, anionic surfactants, nonionic surfactants, and amphoteric surfactants, which are commonly used in the art.

Polymerization initiators usable herein include potassium persulfate, ammonium persulfate, hydrogen persulfate, azobisisobutyronitrile, benzoyl peroxide, dibutyl peroxide, peracetic acid, cumene hydroperoxide, t-butyl hydroxyperoxide, and p-menthane hydroxyperoxide.

Chain transfer agents usable for the polymerization include t-dodecylmercaptan, n-dodecylmercaptan, n-octylmercaptan, xanthogen compound, such as dimethylxanthogendisulfide or diisobutylxanthogendisulfide, dipentene, indene, 1,4-cyclohexadiene, dihydrofuran, and xanthen.

According to a preferred embodiment of the present invention, the core comprises an epoxy resin or a urethane resin with a resin having a crosslinked structure being more preferred. According to another preferred embodiment of the present invention, the core comprises an acrylic resin and/or a methacrylic resin with a resin having a crosslinked structure being more preferred. Preferably, the shell has a structure having a surface with a carboxyl group of an acrylic resin and/or a methacrylic resin. Further, preferably, the functional group on the surface of the shell has been treated with an ammonium salt or an organic alkali, such as amine and/or amide salts, from the viewpoint of allowing the resin particle to stably exist in the ink composition.

According to a preferred embodiment of the present invention, the molecular weight of the water-soluble emulsion is preferably not less than 1000, more preferably about 10,000 to 100,000. The water-soluble emulsion used in the present invention may be a commercially available one, and examples thereof include Z116 manufactured by Mitsui Toatsu Chemicals, Inc.

The amount of the water-soluble emulsion added may be properly determined. For example, it is preferably about 0.5 to 10% by weight, more preferably about 3 to 5% by weight.

The ink composition may contain, in addition to the above ingredients, other ingredients. Examples of other ingredients usable herein include, for example, nozzle clogging preventives, preservatives, antioxidants, electric conductivity adjustors, pH adjustors, viscosity modifiers, surface tension modifiers, and oxygen absorbers.

Saccharides may be added to the ink composition of the present invention from the viewpoint of preventing the ink from drying at the front end of the nozzle. Saccharides usable for this purpose include monosaccharides and polysaccharides. Examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. The amount of the saccharide added is preferably about 0.05 to 30% by weight. In the case of glucose, mannose, fructose, ribose, xylose, arabinose, lactose, galactose, aldonic acid, glucitose., maltose, cellobiose, sucrose, trehalose, and maltotriose, the amount thereof is more preferably 3 to 20% by weight. Alginic acid and salts thereof, cyclodextrins, and celluloses, when added in some amount, are likely to increase the viscosity of the ink, and, hence, the amount thereof is preferably small.

Further, other surfactants may be added to the ink composition of the present invention from the viewpoint of regulating the penetration of the ink. Preferred surfactants which may be added to the ink composition are those having good compatibility with other ingredients, and among others, surfactants having high penetration and stability are preferred. Examples thereof include amphoteric surfactants and nonionic surfactants. Examples of amphoteric surfactants usable herein include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives. Examples of nonionic surfactants usable herein include ether surfactants, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acids.

Preservatives and fungicides usable herein include, for example, sodium benzoate, pentachlorophenol sodium, 2-pyridinethiol-1-oxide sodium, sodium sorbate, sodium dehydroacetate, 1,2-dibenzothiazolin-3-one (Proxel CRL, Proxel BDN, Proxel GXL, Proxel XL-2, and Proxel TN, manufactured by ICI).

pH adjustors, solubilizers, and antioxidants usable herein include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of phosphoric acid, such as potassium phosphate, sodium phosphate, and lithium phosphate; N-methyl-2-pyrrolidone; urea compounds, such as urea, thiourea, and tetramethylurea; allophanate compounds, such as allophanate and methyl allophanate; biuret compounds, such as biuret, dimethylbiuret, and tetramethylbiuret; and L-ascorbic acid and salts thereof. Further, commercially available antioxidants and ultraviolet absorbers are also available. Examples thereof include Tinuvin 328, 900, 1130, 384, 292, 123, 144, 622, 770, and 292, Irgacor 252 and 153, and Irganox 1010, 1076, 1035, and MD1024, manufactured by Ciba-Geigy. It is also possible to use lanthanide oxides.

Viscosity modifiers usable herein include rosin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic, and starch.

Recording Method and Apparatus

Preferably, the ink composition of the present invention is used to yield an image by ink jet recording.

Figure 1:
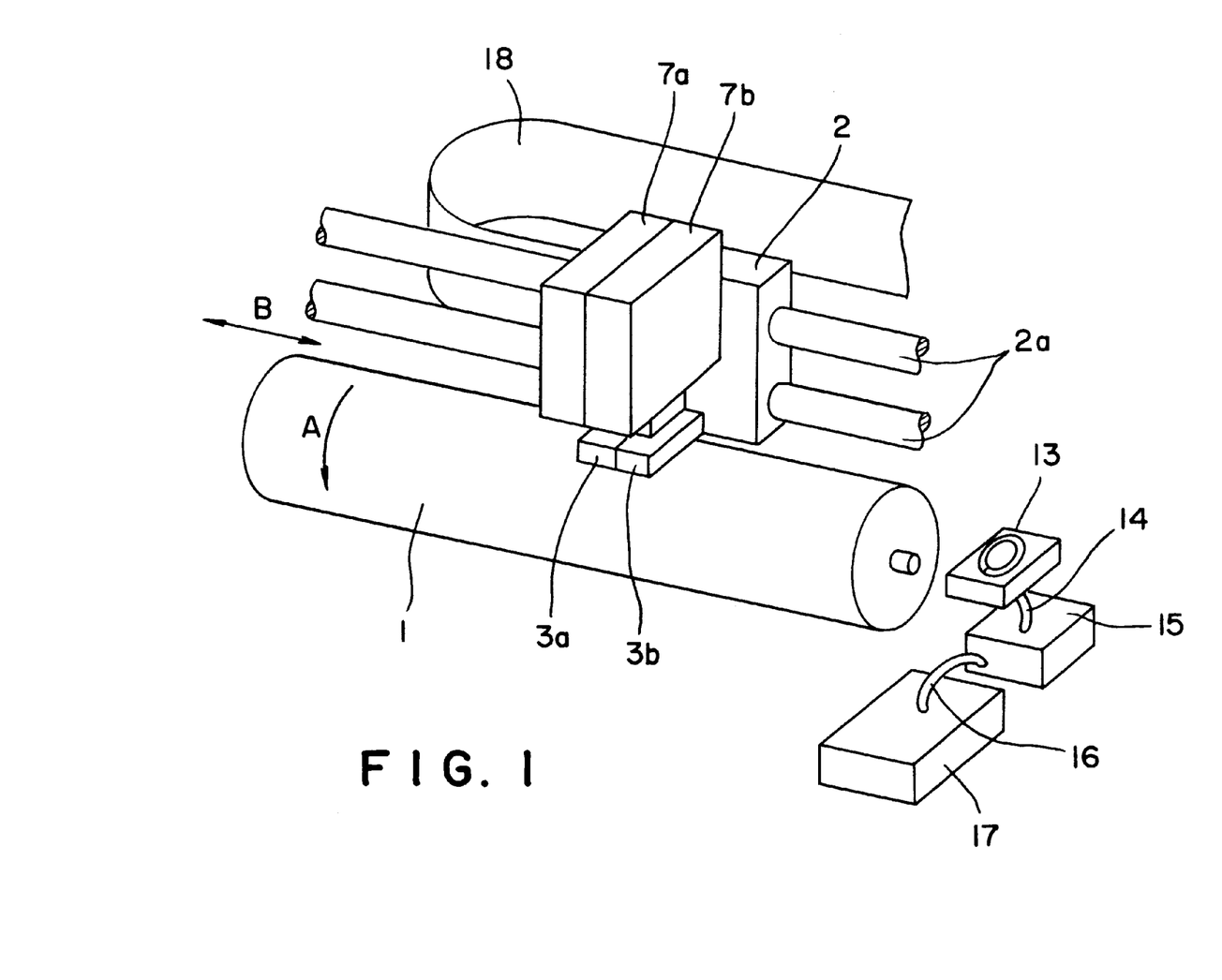
FIG. 1 is a perspective view of an ink jet recording apparatus in which the ink composition according to the present invention is preferably used.

FIG. 1 is a diagram showing one embodiment of an ink jet recording apparatus which may be preferably used with the ink composition of the present invention. The apparatus shown in the drawing comprises a carriage 2 which is reciprocated in a direction indicated by an arrow B on a guide shaft 2a along a platen 1 as recording paper carrying means rotated in a direction indicated by an arrow A for carrying recording paper. The carriage 2 is loaded with a recording head 3a for ejecting a black ink composition in a position close to the platen 1 and a recording head 3b for ejecting a color ink composition. A tank 7a for the black ink composition is provided above the recording head 3a, while a tank 7b for the color ink composition is provided above the recording head 3b. The ink compositions from the ink composition tanks 7a and 7b are fed respectively into the recording head 3a and the recording head 3b.

A signal is sent to the recording heads 3a and 3b through a signal cable 18, and, in response to the signal, droplets of the ink compositions are ejected from the recording head 3a or 3b through a nozzle (not shown). The ejected droplets of the ink compositions are deposited onto a recording medium 20 (for example, paper) wound around the platen 1 to yield an image.

When clogging has occurred in the recording head, the nozzle plate of the recording head is sealed with a cap member 13, followed by suction of the ink compositions by means of a pump 15 connected through the cap member 13 and a conduit 14 to eliminate the clogging. The sucked ink compositions are led to a waste tank 17 through a conduit 16.

In the drawing, only one cap member is provided. Alternatively, a plurality of cap members may be provided respectively for the recording heads 3a and 3b.

Figure 2:
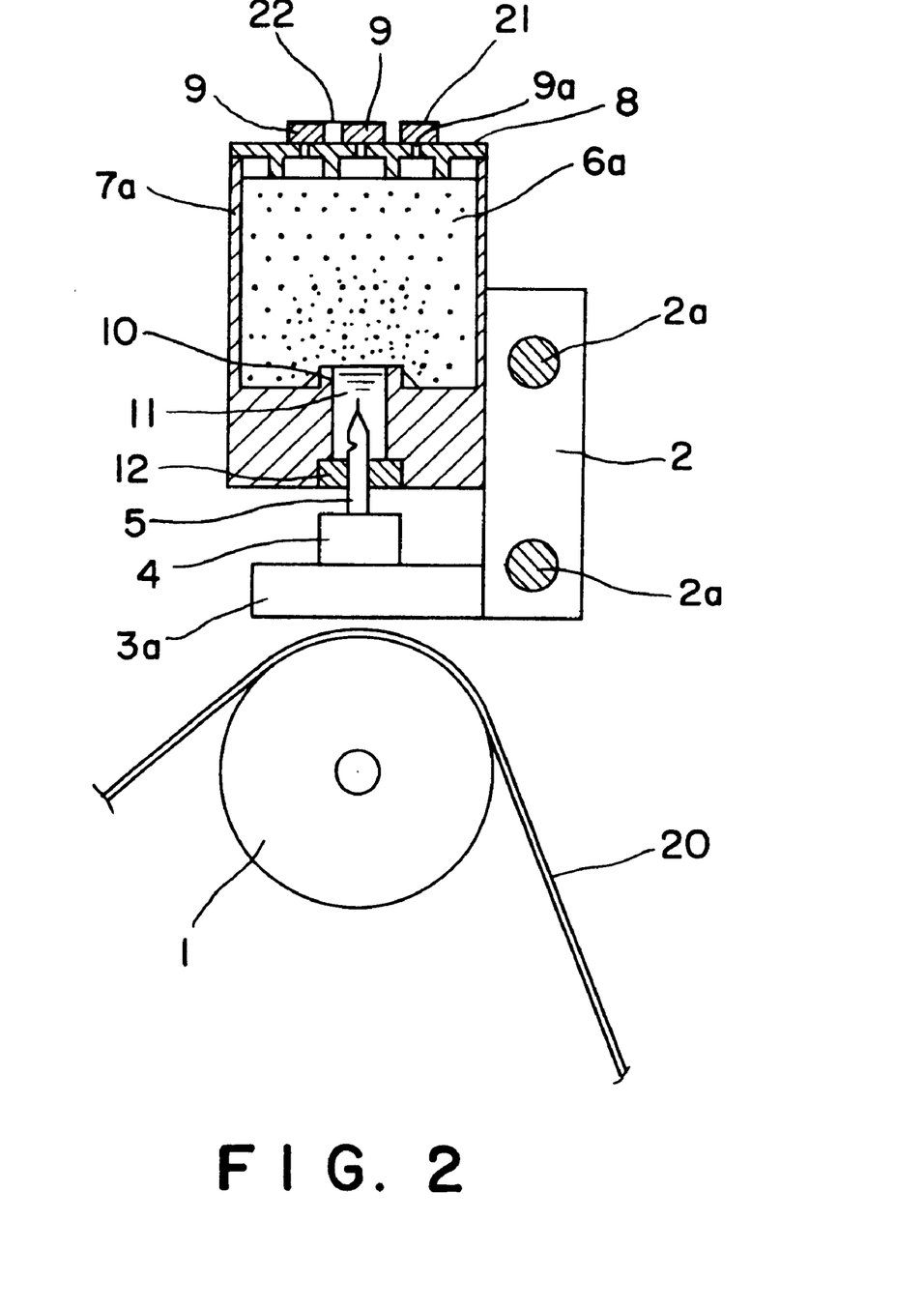
FIG. 2 is an explanatory cross-sectional view of an embodiment of the ink jet recording apparatus shown in FIG. 1.
Figure 3:
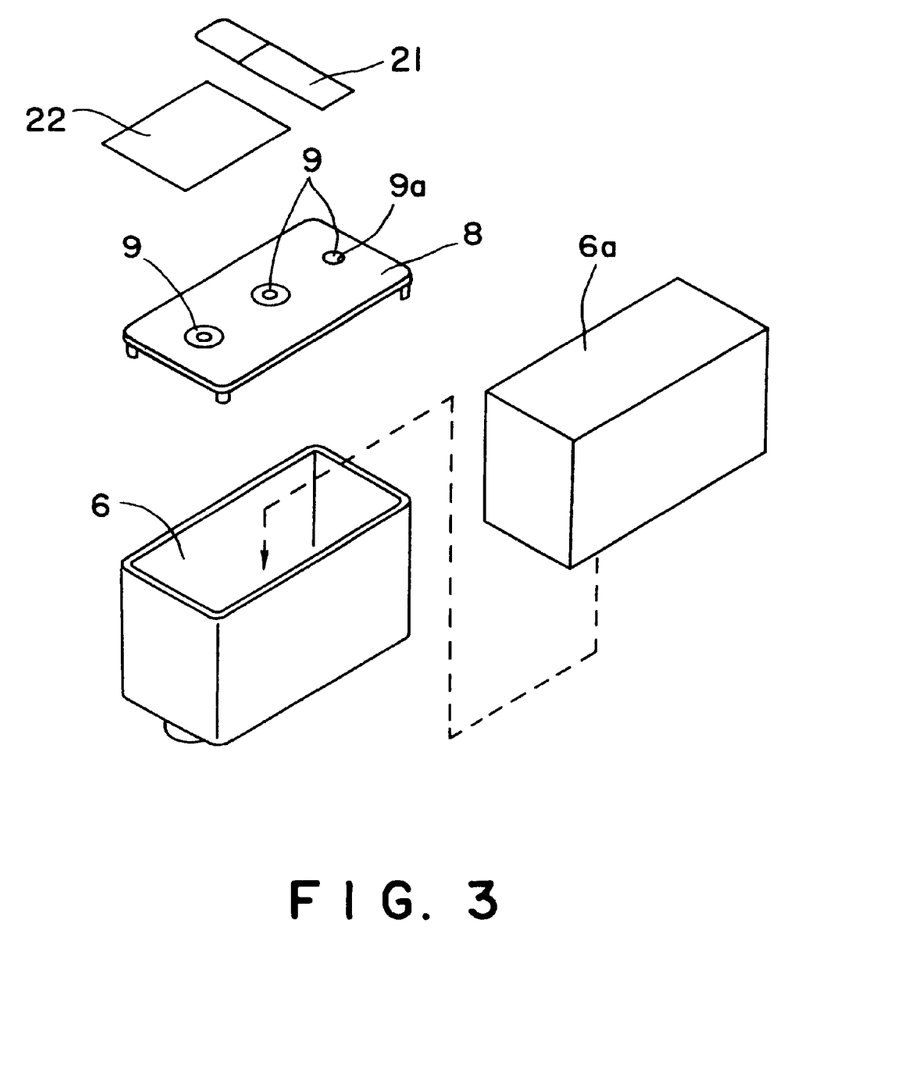
FIG. 3 is an exploded, perspective view of an ink tank used in the ink jet recording apparatus shown in FIG. 1.

Then, the ink tank according to the present invention will be described. FIG. 2 is a cross-sectional view of the ink jet recording apparatus shown in FIG. 1, and FIG. 3 is an exploded, perspective view of an ink tank 7a. The ink tank 7a having an ink composition reservoir 6 housing therein a foam 6a constituted by a porous member, such as a polyurethane foam, is provided above the recording head 3a. The ink tank 7a has a lid 8 provided with a communicating hole 9 communicated with the outside of the ink tank. On the other hand, a base-like protrusion 10 is provided on the bottom face so as to intimately contact with the foam 6a.

There is a communicating section, communicated with the recording head 3a, extending downward from the center portion of the protrusion 10. The communicating section comprises an ink chamber 11 for withdrawing and holding the ink composition contained in the foam 6a and a blank cap 12, constituted by an elastic member, such as rubber, provided at the end of the ink chamber 11.

Insertion of a hollow needle 5 as a communicating member communicated with the recording head 3a and a filter chamber 4 provided on the carriage into the blank cap 12 permits the ink composition impregnated within the ink tank 7a to be fed into the recording head 3a.

At least one communicating hole 9 is placed in a sealed state using an openable, gas-impermeable sealing member 21 under reduced pressure until immediately before use. Immediately before use, the gas-impermeable sealing member 21 is opened to communicate the ink tank 7a with the outside of the ink tank 7a through an air hole 9a. Preferably, the sealing member 21 is constructed so that, as shown in FIG. 3, it has a satisfactory long section and can be easily opened by picking up the end of the long section. During printing, the air hole 9a functions to replenish the ink tank 7a with air by a volume equal to the volume of the consumed ink composition.

The ink composition of the present invention can yield a good image even on recording media, which are likely to cause feathering or bleeding, such as plain paper and recycled paper. Further, the ink composition of the present invention can realize an image having excellent scratch resistance even on recording media having thereon the so-called gloss layer.

According to a preferred embodiment of the present invention, a nozzle plate in the recording head comprises an eutectoid plating of polytetrafluoroethylene and a metal. A combination of a recording head having this nozzle plate with the ink composition according to the present invention can reduce the creation of a deposit onto the nozzle plate. Even when the deposit is created, it can be easily removed by cleaning operation wherein rubber or felt is brought into contact with the nozzle plate.

The ink composition of the present invention can yield a good quality image on various recording media, especially plain paper, recycled paper and, in addition, a special paper having thereon an ink-receptive layer, in particular, a medium having thereon a gloss layer. In the present invention, the recording medium having a gloss layer refers to, for example, a recording medium comprising a white pigment immobilized onto a substrate with the aid of a binder. Examples thereof include: a recording media prepared by coating ceramic fine particles or colloidal particles of colloidal silica, amorphous silica, colloidal alumina, boehmite, pseudo-boehmite, alumina, aluminum hydroxide, precipitated calcium carbonate, calcium bicarbonate, calcium sulfate, kaolin, talc, barium sulfate, rutile, zinc oxide, zinc sulfide, zinc carbonate, aluminum silicate, diatomaceous earth, calcium silicate, magnesium silicate, zeolite, halloysite, magnesium carbonate, magnesium-hydroxide or the like onto a cast coated paper by a special method; and swelling type recording media prepared by coating a resin layer of a polymer or a copolymer of a starch derivative, carboxylmethyl cellulose (CMC), hydroxyethyl cellulose (HEC), casein, gelatin, polyvinyl alcohol, polyvinyl pyrrolidone, melamine resin, urea resin, urethane resin, unsaturated polyester resin, maleic anhydride resin, styrene-butadiene resin, an acrylic acid derivative, a methacrylic acid derivative or the like onto a substrate, the recording media being swollen with an ink. Calendering, casting, pressure contact drying using a heated specular surface wetted with an oil, and coating of a glossy resin may be used for creating gloss. For these recording media having a gloss layer, the fixation of the pigment is often deteriorated when surface voids have a certain size. The ink composition of the present invention can realize an image having excellent scratch resistance independently of the surface state of the recording media.

The ink composition of the present invention may be used in combination with other ink composition(s) to yield a color image. According to a preferred embodiment of the present invention, the ink composition of the present invention is a black ink and used in combination with other ink composition(s) as a color ink (for example, a yellow ink, a magenta ink, and a cyan ink). In particular, addition of the above water-soluble emulsion also to other ink composition (s) can realize an image having excellent scratch resistance. Further, it is also possible to use a method wherein a yellow ink, a magenta ink, and a cyan ink are printed to form a black image and this printing is used in combination with the printing of the black ink of the present invention. Printing methods usable herein include one wherein both images are superimposed on top of the other (preperably applied to a recording medium having a gloss layer) and one wherein these images are alternately formed. In the latter method, areas of these images may be alternately arranged, or alternatively, lines of both ink compositions may be formed and arranged.

An ink having a relatively high content of a solid, such as a pigment, like the ink composition of the present invention, when placed in a nozzle without ejection for a long period of time, is likely to dry at the front face of the nozzle to cause thickening, leading to an ink droplet trajectory directionality problem. Slightly moving the ink with care not to cause the ink to be delivered from the nozzles can stir the ink, permitting the ink to be stably ejected. This can be achieved by pressurizing the ink, by means of pressurizing means for ejecting the ink, with care not to cause the ink to be ejected. In the above regulation, use of an electrostrictive element as the pressurizing means is preferred from the viewpoint of easy regulation. Utilization of this mechanism can increase the content of the pigment in the ink, permitting a high color density to be provided using a pigment type ink and, in addition, the ink to be stably ejected.

When the above slight moving of the ink is carried out in the nozzle plate of an ink jet recording apparatus, this operation is effective for an ink composition having a pigment content of about 5 to 15% by weight, more preferably about 7 to 10% by weight.

In use, the ink composition of the present invention may be filled into an ink tank constructed so that a polyurethane foam is provided therein and the ink comes into contact with the polyurethane foam. In this case, the glycol ether compound, which is preferably used in the present invention, and the acetylene glycol surfactant used in the present invention are adsorbed onto the polyurethane foam. Therefore, preferably, they are added in an excessive amount in consideration of the adsorption. Further, the polyurethane foam can ensure a negative pressure by using the ink composition of the present invention and is less likely to be decomposed by ingredients of the ink used in the present invention, or to create a deposit causative of clogging of the nozzle. A polyurethane foam not using a curing catalyst containing a metal salt or a cationic material is preferred. Specifically, use of a polyurethane foam comprising a polyfunctional isocyanate, such as tolylene diisocyanate or m-xylene diisocyanate, and a material having a plurality of hydroxyl groups, such as a glycol compound having an average molecular weight of about 300 to 3000, such as polypropylene glycol or polyethylene glycol, glycerin, pentaerythritol, dipentaerythritol, neopentyl glycol, propylene glycol, 1,3-butanediol, 1,4-butanediol, or 1,5-pentanediol, is preferred from the viewpoint of ensuring negative pressure, by virtue of the stability of foam shape, and chemical stability.

EXAMPLES

The present invention will be described in more detail with reference to the following examples, though it is not limited to these examples only.

Ink compositions were prepared according to the following formulations.

In the following examples and comparative examples, modified products refer to water-soluble pigments prepared by treating indicated commercially available pigments by a method described in Japanese Patent Laid-Open No. 34981/1996. For the water-soluble pigments, the average particle diameter is expressed in the parentheses (unit: nm).

Further, emulsions A to D used in the following examples were prepared as follows.

Emulsion A: Ion exchanged water (100 parts) was placed in a reaction container equipped with a dropping device, a thermometer, a water cooling type reflux condenser, and a stirrer, and 0.2 part of potassium persulfate as a polymerization initiator was added thereto with stirring in a nitrogen atmosphere of 70° C. A monomer solution prepared by mixing 0.05 part of sodium laurylsulfate, 4 parts of glycidoxy acrylate, 5 parts of styrene, 6 parts of tetrahydrofurfuryl acrylate, 5 parts of butyl acrylate, and 0.02 part of t-dodecylmercaptan with 7 parts of ion exchanged water was added dropwise to the container at 70° C. to allow a reaction to proceed, thereby preparing a primary material. A 10% ammonium persulfate solution (2 parts) was added to the primary material, followed by stirring. Further, a reaction solution composed of 30 parts of ion exchanged water, 0.2 part of potassium laurylsulfate, 30 parts of styrene, 15 parts of butyl methacrylate, 16 parts of butyl acrylate, 2 parts of acrylic acid, 1 part of 1,6-hexanediol dimethacrylate, and 0.5 part of t-dodecylmercaptan was added to the reaction container with stirring at 70° C. to conduct polymerization. Thereafter, the reaction mixture was adjusted to pH 8–8.5 by addition of ammonia and filtered through a 0.3μm filter to prepare an aqueous polymeric fine particle solution as emulsion A.

Emulsion B: Ion exchanged water (100 parts) was placed in a reaction container equipped with a dropping device, a thermometer, a water cooling type reflux condenser, and a stirrer, and 0.2 part of potassium persulfate as a polymerization initiator was added thereto with stirring in a nitrogen atmosphere of 70° C. A monomer solution prepared by mixing 0.05 part of sodium laurylsulfate, 10 parts of styrene, 5 parts of glycidoxy methacrylate, 5 parts of butyl methacrylate, and 0.02 part of t-dodecylmercaptan with 7 parts of ion exchanged water was added dropwise to the container at 70° C. to allow a reaction to proceed, thereby preparing a primary material. A 10% ammonium persulfate solution (2 parts) was added to the primary material, followed by stirring. Further, a reaction solution composed of 30 parts of ion exchanged water, 0.2 part of potassium laurylsulfate, 35 parts of styrene, 25 parts of butyl acrylate, 10 parts of acrylic acid, 1 part of acrylamide, and 0.5 part of t-dodecylmercaptan was added to the reaction container with stirring at 70° C. to conduct polymerization. Thereafter, the reaction mixture was adjusted to pH 8–8.5 by addition of ammonia and filtered through a 0.3 μm filter to prepare an aqueous polymeric fine particle solution as emulsion B.

Emulsion C: Ion exchanged water (100 parts) was placed in a reaction container equipped with a dropping device, a thermometer, a water cooling type reflux condenser, and a stirrer, and 0.2 part of potassium persulfate as a polymerization initiator was added thereto with stirring in a nitrogen atmosphere of 70° C. A monomer solution prepared by mixing 0.05 part of sodium laurylsulfate, 15 parts of styrene, 2 parts of glycidoxy methacrylate, 6 parts of benzyl methacrylate, 10 parts of butyl methacrylate, and 0.02 part of t-dodecylmercaptan with 7 parts of ion exchanged water was added dropwise to the container at 70° C. to allow a reaction to proceed, thereby preparing a primary material. A 10% ammonium persulfate solution (2 parts) was added to the primary material, followed by stirring. Further, a reaction solution composed of 30 parts of ion exchanged water, 0.2 part of potassium laurylsulfate, 30 parts of styrene, 15 parts of butyl methacrylate, 10 parts of acrylic acid, 1 part of triethanolpropane trimethacrylate, 1 part of 1,6-hexanediol dimethacrylate, and 0.5 part of t-dodecylmercaptan was added to the container with stirring at 70° C. to conduct polymerization. Thereafter, the reaction mixture was adjusted to pH 8–8.5 by addition of ammonia and filtered through a 0.3 μm filter to prepare an aqueous polymeric fine particle solution as emulsion C.

Emulsion D: Ion exchanged water (100 parts) was placed in a reaction container equipped with a dropping device, a thermometer, a water cooling type reflux condenser, and a stirrer, and 0.2 part of potassium persulfate as a polymerization initiator was added thereto with stirring in a nitrogen atmosphere of 70° C. A monomer solution prepared by mixing 0.05 part of sodium laurylsulfate, 15 parts of styrene, 1 part of a urethane prepolymer comprising a tolylene diisocyanate and 1,5-pentanediol, 15 parts of butyl methacrylate, and 0.02 part of t-dodecylmercaptan with 7 parts of ion exchanged water was added dropwise to the container at 70° C. to allow a reaction to proceed, thereby preparing a primary material. A 10% ammonium persulfate solution (2 parts) was added to the primary material, followed by stirring. Further, a reaction solution composed of 30 parts of ion exchanged water, 0.2 part of potassium laurylsulfate, 30 parts of styrene, 1 part of acrylamide, 15 parts of butyl methacrylate, 1 part of dipentaerythritol hexamethacrylate, and 0.6 part of t-dodecylmercaptan was added thereto with stirring at 70 to conduct polymerization. Thereafter, the reaction mixture was adjusted to pH 8–8.5 by addition of ammonia and filtered through a 0.3 μm filter to prepare an aqueous polymeric fine particle solution as emulsion D.

The emulsions A to D thus prepared above were the following water-soluble emulsions. Specifically, the emulsion A had a core-shell structure comprising a core having a crosslinked structure of a polymer using glycidoxide-containing acrylic acid and a shell of a resin, prepared by polymerization of acrylic acid, having, on the surface thereof, a carboxyl group of the acrylic resin. The emulsion B had a core-shell structure comprising a core having a crosslinked structure of a copolymer of glycidoxide-containing acrylic acid with methacrylic acid and a shell of a resin, prepared by polymerization of acrylic acid, having, on the surface thereof, a carboxyl group of the acrylic resin and an amide group of the acrylamide. The emulsion C had a core-shell structure comprising a core having a crosslinked structure of a polymer using glycidoxide-containing methacrylic acid and a shell of a resin, prepared by polymerization of acrylic acid and methacrylic acid, having on the surface thereof a carboxyl group of the acrylic resin and methacrylic resin and an amide group of the methacrylamide. The emulsion D had a core-shell structure comprising a core of a mixture of a resin containing a urethane bond with a styrene-acrylic acid copolymer, these resins having a crosslinked structure, and a shell of a resin, prepared by polymerization of methacrylate and acrylamide, having on the surface thereof, a carboxyl group of the methacrylic resin and an amide group of the acrylamide.

Proxel XL-2, as a corrosion preventive for an ink, in an amount of 0.1 to 1% and benzotriazole, as a corrosion preventive for an ink jet recording head member, in an amount of 0.001 to 0.05% were added to water as the balance.

|  | Amount (wt %) |
|---|---|
| Example 1 | |
| Modified product of MA100 (manufactured by Mitsubishi Chemical Corp.) (145) | 6.0 |
| Surfynol 465 | 1.2 |
| Emulsion A | 3.0 |
| Glycerin | 15.0 |
| Diethylene glycol | 5.0 |
| 2-Pyrrolidone | 5.0 |
| Thiodiglycol | 3.0 |
| Triethanolamine | 0.8 |
| Potassium hydroxide | 0.1 |
| Ion exchanged water | Balance |
| Example 2 | |
| Modified product of MA600 (manufactured by Mitsubishi Chemical Corp.) (135) | 7.5 |
| Surfynol 104 | 0.1 |
| Surfynol 465 | 1.9 |
| Emulsion B | 5.0 |
| Glycerin | 12.0 |
| 2-Pyrrolidone | 20.0 |
| Thiodiglycol | 4.0 |
| Triethanolamine | 3.0 |
| Potassium hydroxide | 0.1 |
| Ion exchanged water | Balance |
| Example 3 | |
| Modified product of Color Black FW18 (manufactured by Degussa) (120) | 15.0 |
| Surfynol TG | 0.2 |
| Surfynol 465 | 1.0 |
| Emulsion C | 3.0 |
| Glycerin | 7.0 |
| Diethylene glycol | 3.0 |
| 2-Pyrrolidone | 1.0 |
| 1,5-Pentanediol | 5.0 |
| Triethanolamine | 0.5 |
| Potassium hydroxide | 0.2 |
| Ion exchanged water | Balance |
| Example 4 | |
| Microjet CW1 (50) | 7.0 |
| Surfynol 104 | 0.2 |
| Surfynol 465 | 1.2 |
| Emulsion D | 2.5 |
| 1,5-Pentanediol | 5.0 |
| Glycerin | 15.0 |
| Diethylene glycol | 5.0 |
| Thiodiglycol | 5.0 |
| 2-Pyrrolidone | 1.0 |
| Triethanolamine | 2.5 |
| Potassium hydroxide | 0.01 |
| Ion exchanged water | Balance |

| -continued | |
|---|---|
|  | Amount (wt %) |
| Example 5 | |
| Modified product of #55RCF (manufactured by Mitsubishi Chemical Corp.) (200) | 5.0 |
| Surfynol 465 | 1.2 |
| Emulsion A | 2.5 |
| Emulsion D | 0.5 |
| Glycerin | 1.0 |
| Trimethylolpropane | 3.0 |
| 2-Pyrrolidone | 15.0 |
| Triethanolamine | 0.9 |
| Potassium hydroxide | 0.05 |
| Ion exchanged water | Balance |
| Example 6 | |
| Modified product of MONARCH 880 (manufactured by Cabot Corp.) (60) | 5.0 |
| Surfynol 465 | 0.3 |
| Emulsion B | 10.0 |
| Glycerin | 15.0 |
| 2-Pyrrolidone | 10.0 |
| Triethanolamine | 0.5 |
| Ammonia | 2.0 |
| Potassium hydroxide | 0.1 |
| Ion exchanged water | Balance |

The average particle diameter of carbon black used in the following comparative examples was as indicated within the parentheses.

| Comparative Example 1 | 5.0 |
|---|---|
| MA100 (manufactured by Mitsubishi Chemical Corp.) (90) | |
| Triethylene glycol monomethyl ether | 10.0 |
| Ethylene glycol | 8.0 |
| Dispersant | 3.0 |
| Diethylene glycol monomethyl ether | 7.0 |
| Ion exchanged water | Balance |
| Comparative Example 2 | 5.5 |
| Color Black FW18 (manufactured by Degussa) (120) | |
| Glycerin | 10.0 |
| Diethylene glycol | 10.0 |
| 2-Pyrrolidone | 5.0 |
| Dispersant | 3.5 |
| Ion exchanged water | Balance |
| Comparative Example 3 | 5.5 |
| MONARCH 880 (manufactured by Cabot Corp.) (110) | |
| Diethylene glycol | 10.0 |
| Surfynol 465 | 1.0 |
| Dispersant | 2.5 |
| Ion exchanged water | Balance |

Print Evaluation Test

The above ink composition was filled into an ink jet printer MJ-930C manufactured by Seiko Epson Corporation, and an image was printed on recording media. The recording media used were Conqueror paper, Favorit paper, Modo Copy paper, Rapid Copy paper, EPSON EPP paper, Xerox 4024 paper, Xerox 10 paper, Neenha Bond paper, Ricopy 6200 paper, Yamayuri paper, Xerox R paper, and gloss paper A ( . . . type recording medium prepared by coating a silica sol onto a polyester sheet), gloss paper B (a recording medium prepared by coating a resin onto a polyester sheet, this recording medium being swollen with an ink), and gloss paper C (a recording medium prepared by coating a colloidal silica having an average particle diameter of 500 nm, onto paper, using a latex as a binder).

The print quality, the drying to touch, and the waterfastness of the formed images were evaluated as follows.

Print Quality

The feathering of the print after drying was evaluated according to the following criteria.
A: Substantially no feathering was observed.
B: Some feathering was observed which was still practically acceptable.
C: Feathering was observed which deteriorated the image.
D: Feathering remarkably deteriorated the image.

Drying to Touch

The print after drying was rubbed with an aqueous fluorescent marker pen (yellow) (ZEBRA PEN2, manufactured by Zebra Co., Ltd.), and the smearing of the print was inspected.

The results were evaluated according to the following criteria.
A: The color was not lost by rubbing a plurality of times.
B: The color was not lost by rubbing once.
C: The color was somewhat lost by rubbing once.
D: The color was lost by rubbing once.

Water Fastness

Pure water was dropped onto the print after drying, and one min after the dropping of the pure water, the trace of the water droplet was inspected.

The results were evaluated according to the following criteria.
A: No trace was observed.
B: Substantially no trace was observed.
C: Some trace was observed.
D: Considerably clear trace was observed.

The above results are summarized in the following tables.

TABLE 1

| Ink of invention | Print quality | | | | | | Drying to touch | | | | | | Waterfastness | | | | | |
| --- | --- | --- | --- | --- | --- | --- | --- | --- | --- | --- | --- | --- | --- | --- | --- | --- | --- | --- |
| Recording medium | 1 | 2 | 3 | 4 | 5 | 6 | 1 | 2 | 3 | 4 | 5 | 6 | 1 | 2 | 3 | 4 | 5 | 6 |
| Conqueror | A | A | A | A | A | A | A | A | A | A | A | A | A | A | A | A | A | A |
| Favorit | A | A | A | A | A | A | A | A | A | A | A | A | A | A | A | A | A | A |
| Modo Copy | A | A | A | A | A | A | A | A | A | A | A | A | A | A | A | A | A | A |
| Rapid Copy | A | A | A | A | A | A | A | A | A | A | A | A | A | A | A | A | A | A |
| EPSON EPP | A | A | A | A | A | A | A | A | A | A | A | A | A | A | A | A | A | A |
| Xerox P | A | A | A | A | A | A | A | A | A | A | A | A | A | A | A | A | A | A |
| Xerox 4024 | A | A | A | A | A | A | A | A | A | A | A | A | A | A | A | A | A | A |
| Xerox 10 | A | A | A | A | A | A | A | A | A | A | A | A | A | A | A | A | A | A |
| Neenha Bond | A | A | A | A | A | A | A | A | A | A | A | A | A | A | A | A | A | A |
| Ricopy 6200 | A | A | A | A | A | A | A | A | A | A | A | A | A | A | A | A | A | A |
| Yamayuri | A | A | A | A | A | A | A | A | A | A | A | A | A | A | A | A | A | A |
| Xerox R | A | A | A | A | A | A | A | A | A | A | A | A | A | A | A | A | A | A |
| Gloss paper A | A | A | A | A | A | B | B | B | B | B | B | B | B | B | B | B | B | B |
| Gloss paper B | A | A | A | A | A | B | B | B | B | B | B | B | B | B | B | B | B | B |
| Gloss paper C | A | A | A | A | A | B | B | B | B | B | B | A | A | A | A | A | A | A |

TABLE 2

| Ink of invention | Print quality | | | Drying to touch | | | Waterfastness | | |
| --- | --- | --- | --- | --- | --- | --- | --- | --- | --- |
| Recording medium | 1 | 2 | 3 | 1 | 2 | 3 | 1 | 2 | 3 |
| Conqueror | B | B | B | C | C | C | B | B | B |
| Favorit | B | B | B | C | C | C | B | B | B |
| Modo Copy | B | B | B | C | C | C | B | B | B |
| Rapid Copy | B | B | B | C | C | C | B | B | B |
| EPSON EPP | B | B | B | C | C | C | B | B | B |
| Xerox P | B | B | B | C | C | C | B | B | B |
| Xerox 4024 | B | B | B | C | C | C | B | B | B |
| Xerox 10 | B | B | B | C | C | C | B | B | B |
| Neenha Bond | B | B | B | C | C | C | B | B | B |
| Ricopy 6200 | B | B | B | C | C | C | B | B | B |
| Yamayuri | B | B | B | C | C | C | B | B | B |
| Xerox R | B | B | B | C | C | C | B | B | B |
| Gloss paper A | A | A | A | D | D | D | D | D | D |
| Gloss paper B | A | A | A | D | D | D | D | D | D |
| Gloss paper C | A | A | A | D | D | D | C | C | C |

What is claimed is:

1. An ink composition comprising a pigment, a water-soluble organic solvent, a surfactant and water wherein the pigment is dispersible and/or soluble in water without a dispersant and has an average particle diameter of 50 to 200 nm, and wherein the surfactant is an acetylene glycol surfactant.

2. The ink composition according to claim 1, wherein the pigment has on its surface at least one functional group, selected from carbonyl, carboxyl, hydroxyl, and sulfone groups, or a salt thereof, thereby permitting the pigment to be dispersible and/or soluble in water without a dispersant.

3. The ink composition according to claim 1, wherein the pigment is composed mainly of carbon black.

4. The ink composition according to claim 1, wherein the content of the pigment is 2 to 10% by weight.

5. The ink composition according to claim 1, wherein the content of the acetylene glycol surfactant is 0.3 to 2.0% by weight.

6. The ink composition according to claim 1, which further comprises a water-soluble emulsion.

7. The ink composition according to claim 6, wherein the water-soluble emulsion comprises acrylic acid and/or methacrylic acid.

8. The ink composition according to claim 6, wherein the water-soluble emulsion contains a resin comprising a core and a shell surrounding the core.

9. The ink composition according to claim 8, wherein the core comprises an epoxy resin, a urethane resin, an acrylic resin and/or a methacrylic resin and the shell comprises a resin having a surface on which a carboxyl group of an acrylic resin and/or a methacrylic resin are bonded.

10. The ink composition according to claim 8, wherein the resin of the core is crosslinked.

11. The ink composition according to claim 1, wherein the water-soluble organic solvent is glycerin, diethylene glycol, 1,5-pentanediol, or thiodiglycol or a mixture thereof.

12. The ink composition according to claim 1, further comprising 2-pyrrolidone.

13. The ink composition according to claim 1, further comprising triethanolamine.

14. The ink composition according to claim 1, having a pH of 7 to 11.

15. The ink composition according to claim 1, further comprising potassium hydroxide.

16. A recording method comprising the step of depositing an ink composition onto a recording medium, wherein the ink composition is one according to claim 1.

17. A record medium obtained by the ink jet recording method according to claim 16.

18. An ink jet recording method comprising the step of: ejecting a droplet of an ink composition; and depositing the droplet onto a recording medium, wherein the ink composition is one according to claim 1.

19. An ink jet recording apparatus comprising an ink jet recording head provided with nozzles for ejecting an ink droplet onto a recording medium, an ink container, ink feed means for feeding an ink composition from the ink container to the recording head, wherein the ink container contains the ink composition according to claim 1.

20. The ink jet recording apparatus according to claim 19, wherein the ink container has therein a urethane foam.

21. The ink jet recording apparatus according to claim 19, wherein a nozzle plate of the recording head has been subjected to eutectoid plating with polytetrafluoroethylene and a metal.

22. The inkjet recording apparatus according to claim 19, wherein means for ejecting a color ink composition is further provided and means is provided wherein, when printing is performed onto recording medium having an ink-receptive layer, the color ink composition is first printed and a second ink composition is printed thereon, said second ink composition comprising a pigment, a water-soluble organic solvent, a surfactant, and water, wherein the pigment is dispersible and/or soluble in water without a dispersant and the surfactant is an acetylene glycol surfactant.

23. An ink composition comprising a pigment in an amount of 2–10% by weight, a water-soluble organic solvent in an amount of 0.1–60% by weight, a surfactant in an amount of 0.3–2% by weight, and water, wherein the pigment is dispersible and/or soluble in water without a dispersant and the surfactant is an acetylene glycol surfactant, and wherein the pigment has on its surface at least one functional group selected from carbonyl, carboxyl, hydroxyl, and sulfone groups, or a salt thereof, thereby permitting the pigment to be dispersible and/or soluble in water without a dispersant.

* * * * *